United States Patent
Yoshioka et al.

(10) Patent No.: US 7,217,760 B2
(45) Date of Patent: May 15, 2007

(54) WATER-AND-OIL REPELLANT COMPOSITION WITH IMPROVED SUITABILITY FOR COLD CURE

(75) Inventors: Takuya Yoshioka, Settsu (JP); Masato Kashiwagi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 72 days.

(21) Appl. No.: 10/471,179

(22) PCT Filed: Mar. 6, 2002

(86) PCT No.: PCT/JP02/02051

§ 371 (c)(1),
(2), (4) Date: Jan. 16, 2004

(87) PCT Pub. No.: WO02/072727

PCT Pub. Date: Sep. 19, 2002

(65) Prior Publication Data

US 2004/0147665 A1 Jul. 29, 2004

(30) Foreign Application Priority Data

Mar. 9, 2001 (JP) ............................... 2001-067122

(51) Int. Cl.
*D06M 15/277* (2006.01)
*C08L 27/12* (2006.01)
(52) U.S. Cl. ...................... 524/544; 524/551; 526/245; 526/293; 428/394
(58) Field of Classification Search ................ 526/245, 526/293; 524/544, 551
See application file for complete search history.

(56) References Cited

U.S. PATENT DOCUMENTS 3,069,388 A    12/1962  Sterling
4,147,851 A *  4/1979  Raynolds .................... 526/245
4,296,224 A    10/1981 Fukui et al.
4,590,236 A *  5/1986  Konig et al. ................ 524/460
4,684,705 A    8/1987  Yamamoto et al.
5,876,617 A    3/1999  Sato et al.

FOREIGN PATENT DOCUMENTS

| JP | 60-8068 B | 2/1985 |
|---|---|---|
| JP | 10-237133 A | 9/1985 |
| JP | 63-67511 B | 12/1988 |
| JP | 3-221581 A | 9/1991 |
| JP | 03220284 * | 9/1991 |
| JP | 04072315 A * | 3/1992 |
| JP | 4-164990 A | 6/1992 |
| JP | 04164990 A * | 6/1992 |
| JP | 5-186731 A | 7/1993 |
| JP | 8-333422 A | 12/1996 |
| JP | 2000-290329 A | 10/2000 |
| WO | WO 01/05578 A1 | 1/2001 |

OTHER PUBLICATIONS

Machine Translation of JP 2000-290329, Oct. 17, 2000.*
Derwent Abstract (1991-329287) of JP 03-220284 A, Sep. 27, 1991.*
Full English-language translation of JP 04-164990, Jun. 10, 1992.*
International Search Report for PCT/JP02/02051 dated Jun. 4, 2002.

* cited by examiner

*Primary Examiner*—Vasu Jagannathan
*Assistant Examiner*—Vickey Ronesi
(74) *Attorney, Agent, or Firm*—Sughrue Mion, PLLC

(57) ABSTRACT

A fluoropolymer-based water-and-oil repellant composition which comprises a copolymer comprising units derived from (a) an ethylenic monomer having a perfluoroalkyl group, (b) an ethylenic monomer having a group comprising an aromatic ring and a halogen atom or halogenomethyl group bonded thereto, and (c) an ethylenic monomer copolymerizable with these. The composition imparts excellent water and oil repellency through cold cure.

12 Claims, No Drawings

WATER-AND-OIL REPELLANT COMPOSITION WITH IMPROVED SUITABILITY FOR COLD CURE

FIELD OF THE INVENTION

The present invention relates to a water- and oil-repellent composition. Particularly, the present invention relates to a water- and oil-repellent composition having the improved water- and oil-repellency under low temperature curing conditions.

RELATED ART

In an aqueous dispersion type fluorine-containing water- and oil-repellent, various attempts have been made to improve properties obtained by curing at low temperature. The polymer structures are devised in, for example, JP-B-63-67511 (a graft polymer comprising a diene monomer, ether group-containing (meth)acrylate and a fluoromonomer) and JP-A-10-237133 (fluroalkyl acrylate (FA)/stearyl acrylate (StA)/chloroethyl vinyl ether/N-methylol acrylamide (N-MAM), etc.). However, the conventional procedures cannot give sufficient water- and oil-repellency obtained by curing at low temperature. In particular, it is difficult to impart sufficient properties to a polyolefin fiber. JP-B-60-8068 describes that 3-chloro-2-hydroxypropyl methacrylate and the like are copolymerized to improve the durability for a cotton fiber, but sufficient water- and oil-repellency cannot be obtained by curing at low temperature.

In addition, JP-A-4-164990 discloses a composition comprising a nonionic surfactant having an HLB value of at most 10 in addition to a fluorine-containing cationic surfactant and a fluorine-free cationic surfactant. JP-A-4-164990 has the object of improving the dispersion stability, but does not disclose the improvement of the water- and oil-repellency properties.

SUMMARY OF THE INVENTION

The conventional aqueous dispersion type fluorine-containing water- and oil-repellent agents have insufficient water- and oil-repellency obtained by curing at low temperature. In particular, it is desirable to give the water- and oil-repellent agent imparting excellent water- and oil-repellency to a polyolefin fiber which has low heat-resistance of fiber itself and which cannot be cured at high temperature. In addition, it is desirable to give the water- and oil-repellent agent which can impart excellent performances to a cotton fiber as well as the polyolefin fiber by the low temperature drying or heat-treatment in view of energy conservation at drying and/or heat-treatment.

The present inventors discovered that, in an aqueous dispersion type fluorine-containing water- and oil-repellent agent comprising a copolymer of a perfluoroalkyl group-containing ethylenically unsaturated monomer dispersed in an aqueous medium, when the copolymer contains a repeating unit derived from an ethylenically unsaturated monomer containing a group having a halogen atom or a halogenated methyl group bonded to an aromatic ring, the water- and oil-repellent agent can impart excellent performances to both a polyolefin fiber and a cotton fiber even if the agent is cured at low temperature, and then completed the present invention.

That is, the present invention provides:

an aqueous dispersion type fluorine-containing water- and oil-repellent composition comprising a copolymer comprising (a) a perfluoroalkyl group-containing ethylenically unsaturated monomer, (b) an ethylenically unsaturated monomer having a group wherein a halogen atom or a halogenated methyl group is bonded to an aromatic ring, (c) an ethylenically unsaturated monomer which is copolymerizable with the monomers (a) and (b), and optionally (d) a functional group-containing ethylenically unsaturated monomer;

a method of preparing said composition;

a water- and oil-repellent treatment method using said composition; and an article treated with said composition.

DETAILED EXPLANATION OF THE INVENTION

As the ethylenically unsaturated monomer (b) having the group wherein the halogen atom or the halogenated methyl group is bonded to the aromatic ring, preferable is a styrene-based compound. Chloromethylstyrene and chlorostyrene are particularly preferable.

It is believed, for example, that chloromethylstyrene has larger polarity between a carbon atom and a chlorine atom and has higher affinity to a fiber having high polarity such as a cotton fiber than an aliphatic compound such as 2-chloroethyl vinyl ether, and has high affinity to a non-polar polyolefin (for example, polypropylene and polyethylene) fiber because of the absence of an OH group as in 3-chloro-2-hydroxypropyl methacrylate.

Without binding to a specific theory, the reason why the ethylenically unsaturated monomer (b) having the group wherein the halogen atom or the halogenated methyl group is bonded to the aromatic ring can give the excellent performances to both of the polyolefin fiber and the cotton fiber is supposed that said monomer has good balance of affinity to said various fibers.

The amount of the ethylenically unsaturated monomer (b) having the group wherein the halogen atom or the halogenated methyl group is bonded to the aromatic ring is from 0.1 to 10% by weight, for example, from 0.5 to 5% by weight, based on the copolymer.

Non-limiting examples of the perfluroalkyl group-containing ethylenically unsaturated monomer (a) are as follows:

The perfluroalkyl group-containing ethylenically unsaturated monomer (a) is preferably a (meth)acrylate ester containing a perfluoroalkyl group. The perfluroalkyl group-containing ethylenically unsaturated monomer (a) is preferably of the formula:

$$Rf\text{-}R^1\text{—OCOC}(R^2)\text{=}CH_2$$

wherein Rf is a linear or branched perfluoroalkyl group having 3 to 20 carbon atoms;

$R^1$ is a linear or branched alkylene group having 1 to 20 carbon atoms, a group of the formula: $-SO_2N(R^3)R^4-$ or a group of the formula: $-CH_2CH(OR^5)CH_2-$ in which $R^3$ is an alkyl group having 1 to 10 carbon atoms, $R^4$ is a linear or branched alkylene group having 1 to 10 carbon atoms, and $R^5$ is a hydrogen atom or an acyl group having 1 to 10 carbon atoms; and $R^2$ is a hydrogen atom or a methyl group.

Non-limiting specific examples of the monomer (a) containing the perfluoroalkyl group are as follows:

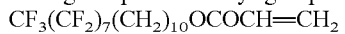
$CF_3(CF_2)_7(CH_2)_{10}OCOCH=CH_2$

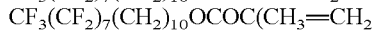
$CF_3(CF_2)_7(CH_2)_{10}OCOC(CH_3)=CH_2$

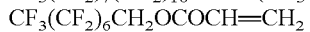
$CF_3(CF_2)_6CH_2OCOCH=CH_2$

$CF_3(CF_2)_8CH_2OCOC(CH_3)=CH_2$

$(CF_3)_2CF(CF_2)_6(CH_2)_2OCOCH=CH_2$

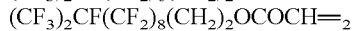
$(CF_3)_2CF(CF_2)_8(CH_2)_2OCOCH=_2$

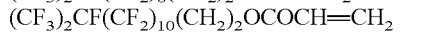
$(CF_3)_2CF(CF_2)_{10}(CH_2)_2OCOCH=CH_2$

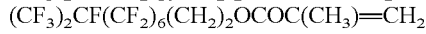
$(CF_3)_2CF(CF_2)_6(CH_2)_2OCOC(CH_3)=CH_2$

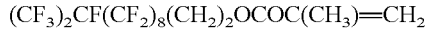
$(CF_3)_2CF(CF_2)_8(CH_2)_2OCOC(CH_3)=CH_2$ $(CF_3)_2CF(CF_2)_{10}(CH_2)_2OCOC(CH_3)=CH_2$
$CF_3CF_2(CF_2)_6(CH_2)_2OCOCH=CH_2$
$CF_3CF_2(CF_2)_8(CH_2)_2OCOCH=CH_2$
$CF_3CF_2(CF_2)_{10}(CH_2)_2OCOCH=CH_2$
$CF_3CF_2(CF_2)_6(CH_2)_2OCOC(CH_3)=CH_2$
$CF_3CF_2(CF_2)_8(CH_2)_2OCOC(CH_3)=CH_2$
$CF_3CF_2(CF_2)_{10}(CH_2)_2OCOC(CH_3)=CH_2$
$CF_3(CF_2)_7SO_2N(CH_3)(CH_2)_2OCOCH=CH_2$
$CF_3(CF_2)_7SO_2N(C_2H_5)(CH_2)_2OCOCH=CH_2$
$(CF_3)_2CF(CF_2)_8CH_2CH(OCOCH_3)CH_2OCOC(CH_3)=CH_2$
$(CF_3)_2CF(CF_2)_6CH_2CH(OH)CH_2OCOCH=CH_2$.

The perfluroalkyl group-containing ethylenically unsaturated monomer (a) may be a monomer having a urethane or urea bond and a fluoroalkyl group. The monomer having the urethane or urea bond and the fluoroalkyl group may be, for example, a compound of the general formula:

$$Rf^1-X^1-A^1-CONH-Y^1-NHCO-A^2-O-C(=O)-CR^3=CH_2$$

wherein $Rf^1$ is a linear or branched perfluoroalkyl group having 3 to 20 carbon atoms;

$X^1$ is $-R^1-$, $-CON(R^2)-Q^1-$ or $-SO_2N(R^2)-Q^1-$, in which $R^1$ is an alkylene group, $R^2$ is a hydrogen atom or a lower alkyl group and $Q^1$ is an alkylene group;

$A^1$ is $-O-$, $-S-$ or $-N(R^2)-$, in which $R^2$ is a hydrogen atom or a lower alkyl group;

$Y^1$ is a residue remaining after removing an isocyanate from an aromatic or alicyclic diisocyanate;

$A^2$ is a bivalent organic group having 2 to 9 carbon atoms and capable of containing at least one oxygen atom; and $R^3$ is a hydrogen atom or a methyl group.

The perfluroalkyl group-containing ethylenically unsaturated monomer (a) is particularly preferably $CF_3CF_2(CF_2CF_2)_nCH_2CH_2OCOCH=CH_2$ (n=2 to 8).

The amount of the perfluroalkyl group-containing ethylenically unsaturated monomer (a) may be from 40 to 95% by weight, preferably from 50 to 90% by weight, more preferably from 55 to 85% by weight, based on the copolymer. If the perfluroalkyl group-containing ethylenically unsaturated monomer (a) is in a small amount, the water- and oil-repellency is not good.

Non-limiting examples of the ethylenically unsaturated monomer (c) copolymerizable with the monomers (a) and (b) are the following fluorine-free monomers.

The fluorine-free monomer is preferably a diene monomer, a (meth)acrylate ester monomer or a di(meth)acrylate ester monomer.

Specific examples of the diene monomer include butadiene, isoprene and chloroprene.

The (meth)acrylate ester monomer may be a compound of the formula:

$$CH_2=CA^1COOA^2$$

or $$CH_2=CA^1COO(R^1-O)_n-A^2$$

wherein $A^1$ is a hydrogen atom or a methyl group, $A^2$ is a $C_1$–$C_{30}$ linear or branched alkyl group, $R^1$ is a $C_1$–$C_6$ linear or branched alkylene group, and n is an integer of 1 to 30.

The di(meth)acrylate ester monomer may be a compound of the formula:

$$CH_2=CA^1COO(R^1)_nOOCA^1C=CH_2$$

or $$CH_2=CA^1COO(R^1-O)_n-OCA^1C=CH_2$$

wherein $A^1$ is a hydrogen atom or a methyl group, $R^1$ is a $C_1$–$C_6$ linear or branched alkylene group, and n is an integer of 1 to 30.

The fluorine-free monomer is a monomer which gives a homopolymer having the glass transition temperature of at most 50° C.

Examples of the monomer having a glass transition temperature of 30 to 50° C. include cetyl acrylate and isobutyl methacrylate for specific examples of the (meth)acrylate ester monomer; and polyethylene glycol(4) diacrylate for specific examples of the di(meth)acrylate ester monomer.

Examples of the monomer having a glass transition temperature of more than 0° C. and less than 30° C. include methyl acrylate, n-butyl methacrylate and cetyl methacrylate for specific examples of the (meth)acrylate ester monomer.

Examples of the monomer having a glass transition temperature of 0° C. or less include isoprene and 1,3-butadiene for specific examples of the diene monomer; and ethyl acrylate, n-butyl acrylate, n-octyl acrylate, 2-ethylhexyl (meth)acrylate and n-lauryl (meth)acrylate for specific examples of the (meth)acrylate ester monomer.

As a comonomer, also suitable are $C_2$–$C_{14}$ alkyl (meth)acrylate, vinyl chloride (VCl), vinylidene chloride (VdCl), butadiene and chloroprene. The amount of the ethylenically unsaturated monomer (c) is preferably at most 60% by weight, more preferably at most 50% by weight, particularly preferably at most 45% by weight, for example, from 0.1 to 45% by weight, based on the copolymer. The suitable ethylenically unsaturated monomer (c) has large effect for improving a film formation property of the polymer at low temperature curing.

If necessary, the following functional group-containing ethylenically unsaturated monomer (d) may be polymerized. The functional group-containing ethylenically unsaturated monomer (d) may or may not contain a fluorine atom, and generally contains no fluorine atom.

The fluorine-free functional group-containing ethylenically unsaturated monomer may be, for example, a compound of the formula:

$$CH_2=CA^1-C(=O)-X^1-A^2$$

wherein $A^1$ is a hydrogen atom or a methyl group, $X^1$ is $-O-$, $-CH_2-$ or $-NH-$, $A^2$ is a hydrogen atom, a hydrophilic group or a group containing a hydrophilic group.

Specific examples of the hydrophilic group in the functional group-containing ethylenically unsaturated monomer (d) include a hydroxyl group, a glycidyl group, an ether group, an ester group, an amino group, a urethane group, a phosphate group and a sulfate group.

Examples of the functional group-containing ethylenically unsaturated monomer (d) include glycidyl methacrylate, hydroxypropyl monomethacrylate, 2-hydroxy-3-phenoxypropyl acrylate, 2-hydroxyethyl acrylate, glycerol monomethacrylate, β-acryloyloxyethyl hydrogen succinate, β-methacryloyloxyethyl hydrogen phthalate, 2-acryloyloxyethylhexahydrophthalic acid, 2-acryloyloxyethylphthalic acid, 2-acryloyloxyethyl-2-hydroxyethylphthalic acid, hydroxypropyl methacrylate trimethylammonium chloride, dimethylaminoethyl methacrylate, diethylaminoethyl methacrylate, 2-acryloyloxyethyl acid phosphate, glucosylethyl methacrylate, methacrylamide, 2-acrylamido-2-methylpropanesulfonic acid, 2-hydroxy-3-acryloyloxypropyl methacrylate, 2-methacryloyloxyethyl acid phosphate and neopentyl glycol hydroxypivalate diacrylate.

Other examples of the functional group-containing ethylenically unsaturated monomer (d) include 3-chloro-2-hydroxypropyl methacrylate, chloroethyl vinyl ether, tetrahydrofurfuryl (meth)acrylate and polyoxyethylene (meth) acrylate.

Preferable examples of the functional group-containing ethylenically unsaturated monomer (d) is N-methylol (meth) acrylamide.

The amount of the functional group-containing ethylenically unsaturated monomer (d) is preferably at most 10% by weight, more preferably at most 7% by weight, most preferably at most 5% by weight, based on the copolymer. The functional group-containing ethylenically unsaturated monomer (d) has the effects of improving affinity to the fiber and of improving the durability by a self-crosslinking and a reaction with the fiber. When the functional group-containing ethylenically unsaturated monomer (d) is in too much amount, the water- and oil-repellency effect (particularly water-repellency) is bad.

The copolymer of the present invention can be prepared by emulsion polymerization, suspension polymerization, solution polymerization or bulk polymerization. In particular, the emulsion polymerization is preferred. Monomers are emulsion-polymerized by use of water, an emulsifying agent and optionally an organic solvent. The mixture may previously be emulsified by a high-pressure emulsifying machine or the like before polymerization.

The emulsifying agent used may be any type of a surfactant, such as a cationic, anionic, nonionic or amphoteric surfactant.

Examples of the nonionic surfactant used in the present invention are as follows. Specific examples of the nonionic surfactant used in the present invention include polyoxyethylene lauryl ether, polyoxyethylene tridecyl ether, polyoxyethylene cetyl ether, polyoxyethylene polyoxypropylene cetyl ether, polyoxyethylene stearyl ether, polyoxyethylene oleyl ether, polyoxyethylene nonyl phenyl ether, polyoxyethylene octyl phenyl ether, polyoxyethylene monolaurate, polyoxyethylene monostearate, polyoxyethylene mono-oleate, sorbitan monolaurate, sorbitan monostearate, sorbitan monopalmitate, sorbitan monostearate, sorbitan mono-oleate, sorbitan sesquioleate, sorbitan trioleate, polyoxyethylene sorbitan monolaurate, polyoxyethylene sorbitan monopalmitate, polyoxyethylene sorbitan monostearate, polyoxyethylene sorbitan monooleate, polyoxyethylene polyoxypropylene block polymer, polyglycerin fatty acid ester, polyether-modified silicone oil (SH3746, SH3748, SH3749 and SH3771 manufactured by Toray Dow Corning Silicone Co., Ltd.), perfluoroalkyl ethylene oxide adduct (UNIDYNE DS-401 and DS-403 manufactured by Daikin Industries, Ltd.), fluoroalkyl ethylene oxide adduct (UNIDYNE DS-406 manufactured by Daikin Industries, Ltd.), and perfluoroalkyl oligomer (UNIDYNE DS-451 manufactured by Daikin Industries, Ltd.).

A preferable structure of the surfactant includes polyoxyethylene dialkylate, polyoxyethylene monoalkylate, polyoxyalkylene alkyl ether and sorbitan alkylate.

Among these, the nonionic surfactant preferably has a low HLB value, specifically the HLB value of preferably at most 11, more preferably at most 9.

Most preferable specific examples of the nonionic surfactant include polyoxyethylene (POE) (8) distearate, polyoxyethylene (POE) (5) dilaurate, POE (2–6) monostearate, POE (6) monooleate, POE (3–5) alkyl ether and POE (2) cetyl ether.

An other nonionic surfactant having an HLB value of more than 11 may be used together with the nonionic surfactant having the HLB value of at most 11 (preferably at most 9), but the other nonionic surfactant preferably has the HLB value between 9 and 13, for example between 11 and 13.

When the combination of the nonionic surfactant having low HLB value (HLB value of at most 11) and the nonionic surfactant having high HLB value is used, the amount of the nonionic surfactant having the HLB value of at most 9 is preferably at least 60% by weight, more preferably at least 80% by weight, based on the total of the nonionic surfactants. The nonionic surfactant having the HLB value of at most 9 alone may be used as the nonionic surfactant.

The amount of the nonionic surfactant having the HLB value of at most 11 (preferably at most 9) is from 0.1 to 100 parts by weight, based on 100 parts by weight of the polymer.

Examples of the cationic surfactant used in the present invention are as follows. Specific examples of the cationic surfactant used in the present invention include dialkyl ($C_{12}$–$C_{22}$) dimethyl ammonium chloride, alkyl (coconut) dimethyl benzyl ammonium chloride, octadecyl amine acetate salt, tetradecyl amine acetate salt, tallow alkyl propylene diamine acetate salt, octadecyl trimethyl ammonium chloride, alkyl (tallow) trimethyl ammonium chloride, dodecyl trimethyl ammonium chloride, alkyl (coconut) trimethyl ammonium chloride, hexadecyl trimethyl ammonium chloride, biphenyl trimethyl ammonium chloride, alkyl (tallow) imidazoline quaternary salt, tetradecyl dimethyl benzyl ammonium chloride, octadecyl dimethyl benzyl ammonium chloride, dioleyl dimethyl ammonium chloride, polyoxyethylene dodecyl monomethyl ammonium chloride, polyoxyethylene alkyl ($C_{12}$–$C_{22}$) benzyl ammonium chloride, polyoxyethylene lauryl monomethyl ammonium chloride, 1-hydroxyethyl-2-alkyl (tallow) imidazoline quaternary salt, a silicone-based cationic surfactant having a siloxane group as a hydrophobic group, and a fluorine-containing cationic surfactant having a fluoroalkyl group as a hydrophobic group (UNIDYNE DS-202 manufactured by Daikin Industries, Ltd.).

Preferable specific examples of the cationic surfactant are monoalkyltrimethyl ammonium salt and dialkyldimethyl ammonium salt. Most preferable specific examples of the cationic surfactant include stearyltrimethyl ammonium chloride, lauryl trimethylammonium chloride, di-harden tallow alkyl dimethyl ammonium chloride and distearyl dimethyl ammonium chloride.

Examples of the anionic surfactant used in the present invention are as follows. Specific examples of the anionic surfactant include sodium lauryl sulfate, lauryl sulfate triethanolamine, sodium polyoxyethylene lauryl ether sulfate, sodium polyoxyethylene nonyl phenyl ether sulfate, polyoxyethylene lauryl ether sulfate triethanolamine, sodium cocoyl sarcosine, sodium N-cocoyl methyl taurine, sodium polyoxyethylene coconut alkyl ether sulfate, sodium diether hexyl sulfosuccinate, sodium α-olefin sulfonate, sodium lauryl phosphate, sodium polyoxyethylene lauryl ether phosphate, and perfluoroalkyl carboxylate salt (UNIDYNE DS-101 and 102 manufactured by Daikin Industries, Ltd.).

Examples of the organic solvent used in the solution polymerization and the emulsion polymerization are as follows: Ketones such as acetone, methyl ethyl ketone and methyl isobutyl ketone; alcohols such as ethanol, isopropanol and butanol; polyhydric alcohols such as 1,3-butanediol, 1,6-hexanediol, ethylene glycol, propylene glycol, dipropylene glycol, tripropylene glycol and glycerol; ethers and esters of polyhydric alcohol such as dipropylene glycol monomethyl ether, tripropylene glycol monomethyl ether, triethylene glycol dimethyl ether and diethylene glycol monobutyl ether acetate; esters such as ethyl acetate, propyl acetate, butyl acetate, dibutyl adipate and dibutyl succinate; hydrocarbon and halogenated hydrocarbon such as toluene, xylene, octane, perchloroethylene and 1,3-dichloro-2,2,3,3,3-pentafluoropropane.

The composition of the present invention can be prepared by emulsion-polymerizing the perfluoroalkyl group-containing ethylenically unsaturated monomer (a), the ethylenically unsaturated monomer (b) having the group wherein the halogen atom or the halogenated methyl group is bonded to the aromatic ring, and other monomer(s) in the presence of the surfactant, preferably the nonionic surfactant having low HLB.

Alternatively, the composition of the present invention can be also prepared by emulsion-polymerizing the perfluoroalkyl group-containing ethylenically unsaturated monomer (a), the ethylenically unsaturated monomer (b) having the group wherein the halogen atom or the halogenated methyl group is bonded to the aromatic ring, and other monomer(s) in the presence of the surfactant, and then optionally adding the nonionic surfactant having low HLB.

In addition to the above-mentioned copolymer, surfactant and medium (for example, water and the organic solvent), the composition of the present invention may contain various additives such as softening agents, cross-linking agents, antistatic agents, flame-retardants and anti-microbial agents. The amount of the surfactant may be from 0.1 to 100 parts by weight, for example, from 1.0 to 80 parts by weight, based on 100 parts by weight of the copolymer.

The composition of the present invention can be applied to a substrate according to a conventionally known method. A method of dispersing the composition into water to dilute it, attaching it on the substrate by a procedure such as dip application, spray application and coat application to the substrate, and drying and/or heat-treating it is usually adopted. The temperature of curing is generally from 80° C. to 180° C., particularly from 80° C. to 140° C.

The concentration of the copolymer is generally from 0.1% to 70% by weight, based on the composition of the present invention. When the composition is diluted with and dispersed in water, the concentration of the copolymer in the treatment liquid may be from 0.01% to 10% by weight, preferably from 0.05% to 5% by weight.

When the substrate is dried and/or heat-treated, the temperature may be at least 150° C., but the temperature limited in view of the heat resistance of the substrate may be at most 140° C., particularly from 80° C. to 120° C. so as to give sufficient properties.

The substrate or article to be treated with the composition of the present invention is preferably a textile. As the textile, various examples can be mentioned. Examples of them include a natural fiber such as cotton, hemp, silk and wool; a synthetic fiber such as a polyamide, a polyester, polyacrylonitrile, polyvinyl chloride and polypropylene; a semi-synthetic fiber such as rayon and acetate; an inorganic fiber such as glass fiber, carbon fiber and asbestos fiber; and a mixture of these fibers. Because the composition of the present invention has the characteristics of exhibiting sufficient properties after drying and/or heat treatment even at not higher than 140° C., it can be effectively applied to a fiber of polyolefin having poor heat resistance, such as polypropylene and polyethylene, a fiber blend thereof and a union fabric.

The textile may be any of in the form of yarn, fabric, nonwoven fabric and the like.

Examples of the article which can be treated with the composition of the present invention include glass, paper, wood, leather, fur, metal and plastics, in addition to the textile.

The article treated with the composition of the present invention can be used in various uses and is not limited. The composition of the present invention can be effectively used in furniture applications, and medical and sanitary applications using polyolefin fibers such as polypropylene fibers and polyethylene fibers, and textile blends thereof and union fabrics which cannot obtain sufficient performances by conventional technologies.

PREFERRED EMBODIMENTS OF THE INVENTION

The following Examples and Comparative Examples, which do not limit the present invention, further illustrate the present invention in detail.

The properties are measured as follows.

Water Repellency

Aqueous solution of isopropyl alcohol (IPA) shown in Table 1 is positioned on a test fabric, the water-repellency is evaluated according to AATCC-TIM118-1992 and then expressed as water-repellency grade shown in Table 1.

TABLE 1

| Water repellency grade | Test liquid (volume ratio %) |
|---|---|
| 10 | IPA 100 |
| 9 | IPA 90/water 10 |
| 8 | IPA 80/water 20 |
| 7 | IPA 70/water 30 |
| 6 | IPA 60/water 40 |
| 5 | IPA 50/water 50 |
| 4 | IPA 40/water 60 |
| 3 | IPA 30/water 70 |
| 2 | IPA 20/water 80 |
| 1 | IPA 10/water 90 |
| W | Water 100 |
| 0 | Inferior to W |

Oil-Repellency

According to AATCC-TM118-1992, several droplets (diameter: 4 mm) of the test liquid shown in Table 2 are positioned on two sites of test fabric, and penetration states of the test liquid are determined after 30 seconds. The oil-repellency is expressed by the oil-repellency grade shown in Table 2.

TABLE 2

| Oil repellency grade | Test solution | Surface tension (dyne/cm, 25° C.) |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | Mixture of n-hexadecane/nujol (35/65) | 29.6 |
| 1 | Nujol | 31.2 |
| 0 | Inferior to 1 | — |

PREPARATIVE EXAMPLE 1

Preparation of Water-Based Water- and Oil-Repellent Agent

A monomer [70 g of perfluoroalkyl ethyl acrylate (FA) [$C_nF_{2n+1}CH_2CH_2COOCH=CH_2$ (a mixture of compounds wherein n is 6, 8, 10, 12 and 14 (average of n is 9))], 24 g of lauryl acrylate (LA), 2.5 g of N-methylol acrylamide (N-MAM) and 3.5 g of chloromethylstyrene (CMS)], an emulsifying agent [2.0 g of di-harden tallow alkyl dimethyl ammonium chloride (cationic surfactant A), 2.0 g of lauryl trimethyl ammonium chloride (cationic surfactant B) and 7.0 g of polyoxyethylene(8) distearate (nonionic surfactant A)], a solvent (30 g of tripropylene glycol (TPG)), a chain transfer agent (0.5 g of dodecylmercaptan) and 191 g of water were charged, mixed with a homomixer and then emulsified with an ultrasonic emulsifier. The flask was replaced with nitrogen, an initiator (0.6 g of 2,2'-azobis(2-amidinopropane) dihydrochloride) was added and the polymerization was conducted at 60° C. over 4 hours. The disappearance of the monomers was confirmed by GC. The resultant water- and oil-repellent composition had a solid content (residue after evaporation at 130° C. over 2 hours) of 33% by weight.

PREPARATIVE EXAMPLES 2 to 9 AND COMPARATIVE PREPARATIVE EXAMPLES 1 to 6

Preparation of Water-Based Water- and Oil-Repellent Agent

Types and amounts of monomers and emulsifying agents shown in Table A were used in the same manner as in Preparative Example 1 to give a water- and oil-repellent composition.

PREPARATIVE EXAMPLE 10

Preparation of Water-Based Water- and Oil-Repellent Agent

A monomer [70 g of FA, 19 g of LA, 2.5 g of N-MAM and 3.5 g of CMS], an emulsifying agent [2.0 g of the cationic surfactant A, 2.0 g of the cationic surfactant B, 5.0 g of the nonionic surfactant A and 2.0 g of branched primary lauryl alcohol POP(6) POE(20) adduct (nonionic surfactant B)], a solvent (30 g of TPG), a chain transfer agent (0.5 g of dodecyl mercaptan) and 191 g of water were charged, mixed with a homomixer and then emulsified with an ultrasonic emulsifier. The emulsified liquid was charged into an autoclave and degassed to vacuum, and 7.1 g of a vinyl chloride monomer was charged. An initiator (0.6 g of 2,2'-azobis(2-amidinopropane) dihydrochloride) was added to conduct the polymerization at 60° C. over 4 hours. After the completion of the polymerization, unreacted vinyl chloride monomer was removed off (The conversion of the vinyl chloride monomer was about 70%). The disappearance of the other monomers was confirmed by gas chromatography (GC). The resultant water- and oil-repellent composition had a solid content (residue after evaporation at 130° C. over 2 hours) of 33% by weight.

PREPARATIVE EXAMPLES 11 TO 15

Preparation of Water-Based Water- and Oil-Repellent Agent

Types and amounts of monomers and emulsifying agents shown in Table B were used in the same manner as in Preparative Example 10 to give a water- and oil-repellent composition.

EXAMPLE 1

The water- and oil-repellent composition obtained in Preparative Example 1 was diluted with water to give a water- and oil-repellent treatment liquid having a solid content of 0.5% by weight. A polypropylene (PP) fabric (twill weave) and a cotton fabric (twill) were dipped into this treatment liquid and squeezed with rolls. The wet pick up was 75% for the PP fabric and 65% for the cotton fabric. These treated fabrics were dried with a pin tenter at 100° C. for 3 minutes. Then the water- and oil-repellency test was conducted. The test results are shown in Table A.

EXAMPLES 2 TO 15 AND COMPARATIVE EXAMPLES 1 TO 6

The water- and oil-repellent composition obtained in Preparative Examples 2 to 15 and Comparative Preparative Examples 1 to 6 was subjected to the water- and oil-repellency test as in Example 1. Test results are shown in Tables A and B.

EXAMPLE 16

The water- and oil-repellent composition obtained in Preparative Example 1 was diluted with water to give a water- and oil-repellent treatment liquid having a solid content of 0.5% by weight. A propylene (PP) fabric for furniture (weight per unit area of fabric: 197 g/m$^2$), a propylene (PP)/cotton union fabric for furniture (weight per unit area of fabric: 380 g/m$^2$), a cotton fabric for furniture (weight per unit area of fabric: 235 g/m$^2$) and a propylene non-woven fabric for medical use (weight per unit area of fabric: 40 g/m$^2$) were dipped into this treatment liquid and squeezed with rolls. These treated fabrics were dried with a pin tenter and the water- and oil-repellency test was conducted. The wet pick up and drying conditions were 64%; 100° C. and 3 minutes for the furniture use PP fabric; 67%; 80° C. and 6 minutes for the furniture use PP/cotton union fabric; 71%; 80° C. and 3 minutes for the furniture use cotton fabric; and 130%; 90° C. and 2 minutes for the medical use PP non-woven fabric. The test results are shown in Table C.

COMPARATIVE EXAMPLE 7

The water-and oil-repellent composition obtained in Comparative Preparative Example 1 was subjected to the water- and oil-repellency test as in Example 15. Test results are shown in Table C.

TABLE A

|  | Example | | | | | | | | | Com. Ex. | | | | | |
| --- | --- | --- | --- | --- | --- | --- | --- | --- | --- | --- | --- | --- | --- | --- | --- |
|  | 1 | 2 | 3 | 4 | 5 | 6 | 7 | 8 | 9 | 1 | 2 | 3 | 4 | 5 | 6 |
| FA | 70 | 70 | 70 | 70 | 60 | 80 | 70 | 70 | 70 | 70 | 70 | 70 | 70 | 70 | 70 |
| LA | 24 | 24 | 25.5 | 26.5 | 34 | 14 | — | 24 | 24 | 27.5 | 24 | 24 | 24 | 24 | — |
| 2EHA | — | — | — | — | — | — | 24 | — | — | — | — | — | — | — | — |
| StA | — | — | — | — | — | — | — | — | — | — | — | — | — | — | 24 |
| N-MAM | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| CMS | 3.5 | 3.5 | 2 | 1 | 3.5 | 3.5 | 3.5 | — | 3.5 | — | — | — | — | — | — |
| CS | — | — | — | — | — | — | — | 3.5 | — | — | — | — | — | — | — |
| HEMA | — | — | — | — | — | — | — | — | — | — | — | 3.5 | — | — | — |
| CHPMA | — | — | — | — | — | — | — | — | — | — | — | — | 3.5 | — | — |
| CEVE | — | — | — | — | — | — | — | — | — | — | — | — | — | 3.5 | 3.5 | 3.5 |
| Cationic surfactant (A) | 2 | 2 | 2 | 2 | 2 | 2 | 2 | 2 | 2 | 2 | 2 | 2 | 2 | 2 | 2 |
| Cationic surfactant (B) | 2 | 2 | 2 | 2 | 2 | 2 | 2 | 2 | 2 | 2 | 2 | 2 | 2 | 2 | 2 |
| Nonionic surfactant (A) | 7 | 4.5 | 7 | 7 | 7 | 7 | 7 | 7 | — | — | — | — | 7 | — | — |
| Nonionic surfactant (B) | — | 2.5 | — | — | — | — | — | — | — | — | — | — | — | — | — |
| Nonionic surfactant (C) | — | — | — | — | — | — | — | — | 7 | 7 | 7 | 7 | — | 7 | 7 |
| PP fabric (twill weave) | | | | | | | | | | | | | | | |
| Water repellency (IPA/water) | 7 | 7 | 7 | 7 | 7 | 7 | 7 | 6 | 4 | 3 | 3 | 3 | 5 | 3 | 1 |
| Oil repellency | 3 | 3 | 3 | 2 | 2 | 3 | 3 | 2 | 1 | 0 | 0 | 1 | 1 | 1 | 0 |
| Cotton fabric (twill) | | | | | | | | | | | | | | | |
| Water repellency (IPA/water) | 8 | 8 | 8 | 8 | 8 | 7 | 8 | 7 | 6 | 4 | 5 | 6 | 5 | 5 | 0 |
| Oil repellency | 6 | 6 | 6 | 5 | 5 | 6 | 6 | 4 | 4 | 1 | 3 | 4 | 2 | 2 | 0 |

Nonionic surfactant (A): POE(8) distearate (HLB value: 8.5)
Nonionic surfactant (B): Branched primary lauryl alcohol POP(6) POE(20) adduct (HLBvalue: 12.3)
Nonionic surfactant (C): POE(20) octyl phenyl ether (HLBvalue: 16.2)
Cationic surfactant (A): Di-harden tallow alkyl dimethyl ammonium chloride
Cationic surfactant (B): Lauryl trimethyl ammonium chloride
FA: Perfluoroalkylethyl acrylate
LA: Lauryl acrylate
2EHA: 2-Ethylhexyl acrylate
StA: Stearyl acrylate
N-MAM: N-Methylol acrylamide
CMS: Chloromethylstyrene
CS: Chlorostyrene
HEMA: 2-Hydroxyethyl methacrylate
CEVE: 2-Chloroethyl vinyl ether
CHPMA: 3-Chloro-2-hydroxypropyl methacrylate

TABLE B

|  | Example | | | | | |
| --- | --- | --- | --- | --- | --- | --- |
|  | 10 | 11 | 12 | 13 | 14 | 15 |
| FA | 70 | 70 | 80 | 80 | 80 | 80 |
| LA | 19 | — | — | — | — | — |
| 2EHA | — | 14 | — | — | — | — |
| VCl | 5 | 10 | 14 | — | — | — |
| VdCl | — | — | — | 14 | — | — |
| Butadiene | — | — | — | — | 14 | — |
| Chloroprene | — | — | — | — | — | 14 |
| N-MAM | 2.5 | 2.5 | 2.5 | 2.5 | 2.5 | 2.5 |
| CMS | 3.5 | 3.5 | 3.5 | 3.5 | 3.5 | 3.5 |
| Cationic surfactant (A) | 2 | 2 | 2 | 2 | 2 | 2 |
| Cationic surfactant (B) | 2 | 2 | 2 | 2 | 2 | 2 |
| Nonionic surfactant (A) | 5 | 5 | 5 | 5 | 5 | 5 |
| Nonionic surfactant (B) | 2 | 2 | 2 | 2 | 2 | 2 |
| PP fabric (twill weave) | | | | | | |
| Water repellency (IPA/water) | 8 | 7 | 7 | 7 | 6 | 7 |
| Oil repellency | 4 | 3 | 3 | 3 | 3 | 3 |
| Cotton fabric (broad) | | | | | | |
| Water repellency (IPA/water) | 9 | 8 | 7 | 8 | 6 | 7 |
| Oil repellency | 6 | 6 | 5 | 6 | 5 | 5 |

Nonionic surfactant (A): POE(8) distearate (HLB value: 8.5)
Nonionic surfactant (B): Branched primary lauryl alcohol POP(6) POE(20) adduct (HLB value: 12.3)
Cationic surfactant (A): Di-harden tallow alkyl dimethylammonium chloride
Cationic surfactant (B): Lauryl trimethyl ammonium chloride
FA: Perfluoroalkylethyl acrylate
LA: Lauryl acrylate
2EHA: 2-Ethylhexyl acrylate
VCl: Vinyl chloride
VdCl: Vinylidene chloride
N-MAM: N-Methylol acrylamide
CMS: Chloromethylstyrene

TABLE C

|  | Example 16 | Com. Ex. 7 |
| --- | --- | --- |
| FA | 70 | 70 |
| LA | 24 | 27.5 |

TABLE C-continued

|  | Example 16 | Com. Ex. 7 |
|---|---|---|
| N-MAM | 2.5 | 2.5 |
| CMS | 3.5 | — |
| Cationic surfactant (A) | 2 | 2 |
| Cationic surfactant (B) | 2 | 2 |
| Nonionic surfactant (A) | 7 | — |
| Nonionic surfactant (C) | — | 7 |
| *PP fabric for furniture* | | |
| Water repellency(IPA/water) | 7 | 2 |
| Oil repellency | 4 | 1 |
| *PP/cotton union fabric for furniture* | | |
| Water repellency (IPA/water) | 10 | 4 |
| Oil repellency | 6 | 1 |
| *Cotton fabric for furniture* | | |
| Water repellency(IPA/water) | 10 | 5 |
| Oil repellency | 7 | 2 |
| *PP non-woven fabric for medical use* | | |
| Water repellency(IPA/water) | 9 | 3 |
| Oil repellency | 3 | 0 |

FA: Perfluoroalkylethyl acrylate
LA: Lauryl acrylate
N-MAM: N-Methylol acrylamide
CMS: Chloromethylstyrene
Nonionic surfactant (A): POE(8) distearate (HLB value: 8.5)
Nonionic surfactant (C): POE(20) octyl phenyl ether (HLB value: 16.2)
Cationic surfactant (A): Di-harden tallow alkyl dimethyl ammonium chloride
Cationic surfactant (B): Lauryl trimethyl ammonium chloride

EFFECTS OF THE INVENTION

The aqueous dispersion type fluorine-containing water- and oil-repellent agent of the present invention imparts excellent water- and oil-repellency performances when cured at low temperature. The sufficient water- and oil-repellency of various fibers such as a polyolefin fiber and a cotton fiber can be obtained by low energy at the drying and/or heat-treatment.

The invention claimed is:

1. A fluorine-containing water- and oil-repellent composition comprising a copolymer having units derived from:
   (a) a perfluoroalkyl group-containing ethylenically unsaturated monomer in the amount of 40 to 95% by weight,
   (b) an ethylenically unsaturated monomer having a group wherein a halogen atom or a halogenated methyl group is bonded to an aromatic ring in the amount of 0.1 to 10% by weight,
   (c) an ethylenically unsaturated monomer copolymerizable with the monomers (a) and (b) in the amount of 0.1 to 60% by weight, and
   (d) a functional group-containing ethylenically unsaturated monomer in the amount of 0 to 10% by weight,
   the copolymer being prepared by emulsion-polymerizing the monomers (a) to (d) in the presence of a surfactant, and
   the copolymer being dispersed in a water-based medium with a surfactant,
   wherein the ethylenically unsaturated monomer (b) is chloromethylstyrene or chlorostyrene.

2. The composition according to claim 1, wherein the perfluoroalkyl group-containing ethylenically unsaturated monomer (a) is perfluoroalkyl group-containing (meth)acrylate.

3. The composition according to claim 1, wherein the copolymerizable ethylenically unsaturated monomer (c) is at least one selected from the group consisting of $C_2$–$C_{14}$ alkyl (meth)acrylates, vinyl chloride (VCl), vinylidene chloride (VdCl), butadiene and chloroprene.

4. The composition according to claim 1, wherein the copolymerizable ethylenically unsaturated monomer (c) is at least one selected from the group consisting of monomers which give a homopolymer having Tg of at most 50° C.

5. The composition according to claim 1, wherein the functional group-containing ethylenically unsaturated monomer (d) contains an OH group.

6. The composition according to claim 1, wherein the surfactant comprises a nonionic surfactant having an HLB value of at most 9 and a cationic surfactant.

7. A method of preparing a fluorine-containing water- and oil-repellent composition comprising a copolymer having units derived from:
   (a) a perfluoroalkyl group-containing ethylenically unsaturated monomer in the amount of 40 to 95% by weight,
   (b) an ethylenically unsaturated monomer having a group wherein a halogen atom or a halogenated methyl group is bonded to an aromatic ring in the amount of 0.1 to 10% by weight,
   (c) an ethylenically unsaturated monomer copolymerizable with the monomers (a) and (b) in the amount of 0.1 to 60% by weight, and
   (d) a functional group-containing ethylenically unsaturated monomer in the amount of 0 to 10% by weight,
   the copolymer being dispersed in a water-based medium with a surfactant, and
   wherein the ethylenically unsaturated monomer (b) is chloromethyistyrene or chlorostyrene,
   comprising copolymerizing the perfluoroalkyl group-containing ethylenically unsaturated monomer (a), the ethylenically unsaturated monomer (b) having the group wherein the halogen atom or the halogenated methyl group is bonded to the aromatic ring, the ethylenically unsaturated monomer (c) copolymerizable therewith, and optionally the functional group-containing ethylenically unsaturated monomer (d) in the presence of a nonionic surfactant having an HLB of at most 9 by an emulsion polymerization procedure.

8. A method of processing a fiber, comprising applying the composition according to claim 1 to a fiber, and then drying and/or heat-treating the fiber.

9. The method according to claim 8, wherein the drying and/or heat-treatment are conducted at a temperature of at most 140° C.

10. An article processed by the method according to claim 8.

11. The article according to claim 10, which is a polyolefin fiber.

12. The article according to claim 10, which is used in furniture applications, or medical and sanitary applications.

* * * * *